United States Patent
Croak et al.

(10) Patent No.: US 8,718,265 B2
(45) Date of Patent: *May 6, 2014

(54) METHOD AND APPARATUS FOR ROUTING A CALL TO A SUBJECT MATTER EXPERT VIA A PACKET NETWORK

(71) Applicant: AT&T Intellectual Property II, L.P., Atlanta, GA (US)

(72) Inventors: Marian Croak, Fair Haven, NJ (US); Hossein Eslambolchi, San Diego, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/059,227

(22) Filed: Oct. 21, 2013

(65) Prior Publication Data
US 2014/0050314 A1    Feb. 20, 2014

Related U.S. Application Data

(63) Continuation of application No. 11/261,695, filed on Oct. 28, 2005, now Pat. No. 8,565,409.

(51) Int. Cl.
*H04M 3/00* (2006.01)
*H04M 3/523* (2006.01)

(52) U.S. Cl.
CPC .................. *H04M 3/5233* (2013.01)
USPC ............ 379/265.05; 379/265.01; 379/265.11; 379/265.12

(58) Field of Classification Search
CPC ...................................... H04M 3/5233
USPC ..................................... 379/265.05
See application file for complete search history.

(56) References Cited

U.S. PATENT DOCUMENTS

| | | | |
|---|---|---|---|
| 6,122,364 | A | 9/2000 | Petrunka et al. |
| 6,259,786 | B1 | 7/2001 | Gisby |
| 6,477,164 | B1 | 11/2002 | Vargo et al. |
| 6,757,275 | B2 | 6/2004 | Sorrentino |
| 6,819,667 | B1 | 11/2004 | Brusilovsky et al. |
| 6,879,680 | B2 | 4/2005 | Donovan et al. |
| 6,934,282 | B1 | 8/2005 | Yoon |
| 6,963,561 | B1 | 11/2005 | Lahat |
| 7,016,343 | B1 | 3/2006 | Mermel et al. |
| 7,054,308 | B1 | 5/2006 | Conway |
| 7,215,663 | B1 | 5/2007 | Radulovic |
| 7,272,135 | B1 | 9/2007 | Ohtsu et al. |
| 7,606,718 | B2 | 10/2009 | Cloran |
| 2002/0044547 | A1 | 4/2002 | Dalton et al. |
| 2002/0141352 | A1 | 10/2002 | Fangman et al. |
| 2005/0157708 | A1 | 7/2005 | Chun |

*Primary Examiner* — Huy C Ho

(57) ABSTRACT

A method and apparatus for routing a call to a subject matter expert via a packet network is described. In one embodiment, a request to route said at least one call to the SME is received. A predefined location associated with the SME is also obtained. The call is then routed to a foreign Internet Protocol gateway associated with the predefined foreign location to communicate with the SME.

12 Claims, 4 Drawing Sheets

METHOD AND APPARATUS FOR ROUTING A CALL TO A SUBJECT MATTER EXPERT VIA A PACKET NETWORK

This application is a continuation of U.S. patent application Ser. No. 11/261,695, filed Oct. 28, 2005, which is currently allowed and is herein incorporated by reference in its entirety.

BACKGROUND OF THE INVENTION

1. Field of the Invention

Embodiments of the present invention generally relate to telecommunications systems and, more particularly, to a method and apparatus for routing a call to a subject matter expert via a packet network, e.g., a voice over internet protocol (VoIP) network.

2. Description of the Related Art

Call centers are increasingly becoming globalized in the sense that calls from customers initially directed to domestic 1-800 toll free numbers are being dispersed to subject matter experts (SMEs) located in various developing countries around the world. Although the labor force costs associated with the handling of these calls in many foreign countries are often less expensive compared to those in more developed countries, the telecommunication costs involved with routing these call to a long distance location still remain significantly high-priced.

Thus, there is a need in the art for a method and apparatus for routing a call to an SME via in a packet network.

SUMMARY OF THE INVENTION

In one embodiment, a method and apparatus for routing a call to a subject matter expert via a packet network is described. More specifically, a request to route said at least one call to the SME is received. A predefined location associated with the SME is also obtained. The call is then routed to a foreign Internet Protocol gateway associated with the predefined foreign location to communicate with the SME.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
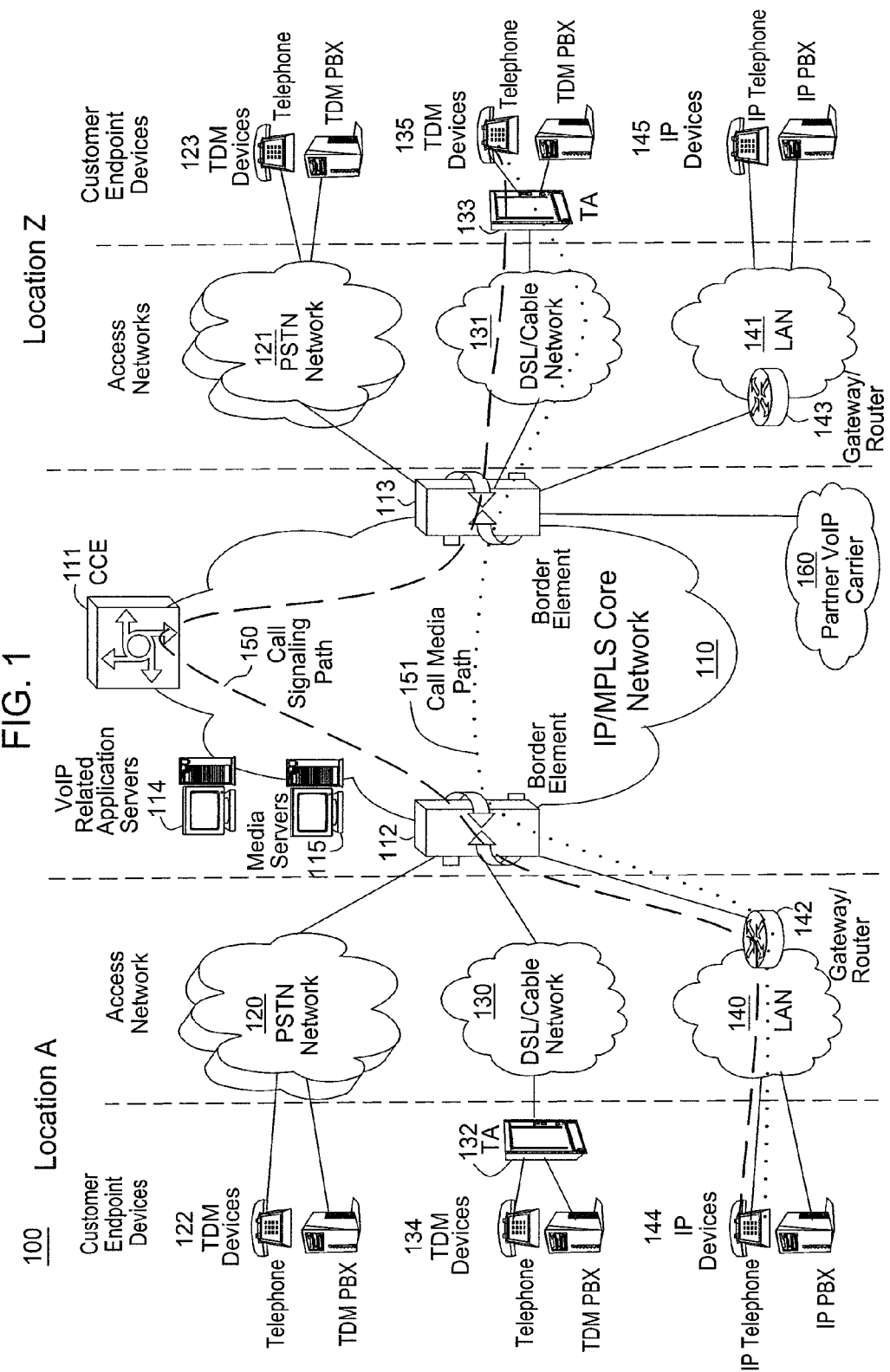
FIG. 1 is a block diagram depicting an exemplary embodiment of a communication system in accordance with the invention.

To better understand the present invention, FIG. 1 illustrates a communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a Service over Internet Protocol (SoIP) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
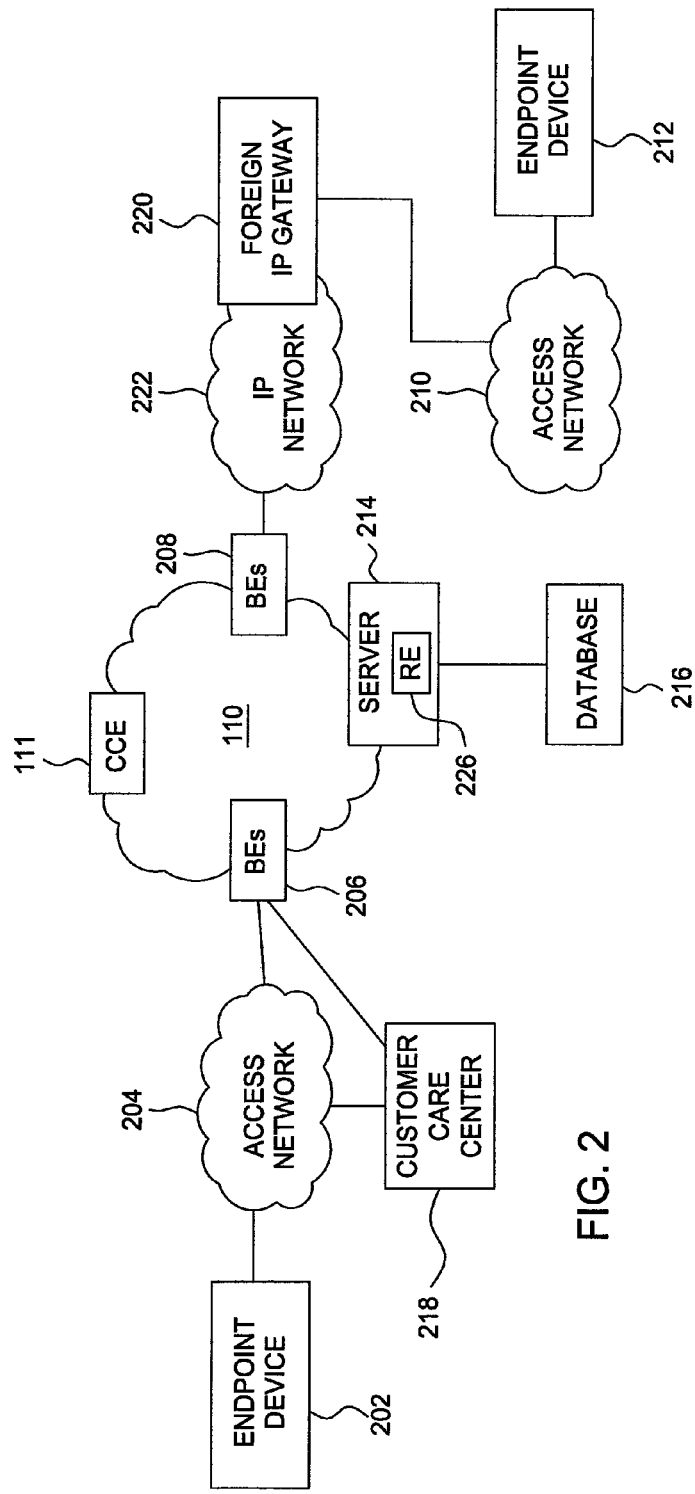
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 (that belongs to a service provider) via an access network 204 and one or more border elements (BEs) 206. An endpoint device 212 is configured for communication with the core network 110 via an access network 210, an international IP gateway 220, an IP network 222, and at least one of a plurality of BEs 208. The endpoint device 202 and the endpoint device 212 may comprise any of the customer endpoint devices described above (e.g., TDM devices, IP devices, etc.). In one embodiment, at least one of the BEs 208 may be configured to function as an Internet Protocol (IP) gateway to the IP network 222. The access networks 204 and 210 may comprise any of the access networks detailed above (e.g., TDM PSTN, DSL/Cable, LAN, etc). The IP gateway (e.g., BE 208) and foreign IP gateway 220 may comprise routing servers to traverse the international IP network 222. Although only one foreign IP gateway 220 is shown in FIG. 2, those skilled in the art realize that a plurality of IP gateways may be located in a given country or region. The core network 110 is also coupled to a customer care center 218 (via an access network or BEs 206), which may comprise of a centralized location of customer care agents that provide assistance to calling customers or subscribers.

The core network 110 also includes a server 214 in communication with a database 216. In one embodiment of the present invention, the server 214 comprises a dedicated application server that is configured to support a routing engine 226 for establishing call connections with subject matter experts (SMEs) located in foreign countries (via an foreign IP gateway 220). The server 214 is also responsible for recording and maintaining various records within the database 216. The database 216 may be any type of electronic collection of data that is well known in the art. In one embodiment, the database 216 stores data associated with the SMEs, such as expert names, areas of expertise, contact information (e.g., phone number), and the like. The database 216 also contains records pertaining to the correct termination points associated with each of the various SMEs as well as records detailing the local agreements with "in country" partner. An "in country" partner may include any entity or company located in a foreign country (in relation to the service provider) that handles the local termination of calls to an SME. Typically, the original service provider and the "in country" partner enter into an agreement that arranges for domestic 1-800 calls routed to SMEs to be terminated over the telecommunication facilities, or other hubbing arrangement, owned or managed by the "in country" partner. These agreements with the foreign entities associated with the service provider enable calls to be completed in an efficient and cost effective manner due to the predefined reduce rates and quality of service.

In one exemplary embodiment, the present invention enables calls directed to a customer care center to be routed via IP networks and terminated over "in country" facilities owned or managed by the "in country" partners. More specifically, the present invention provides a way for a TDM based call to a 1-800 number to be transmitted from a TDM PSTN network (e.g., access network 204) to an IP network (e.g., foreign IP network 222) and then routed to an "in country" partner access network 210 located across the globe for final termination and handling. Domestic customer calls can therefore be transferred to a qualified SME at a globally located termination point at less cost due to the savings incurred with utilizing VoIP technology.

Figure 3:
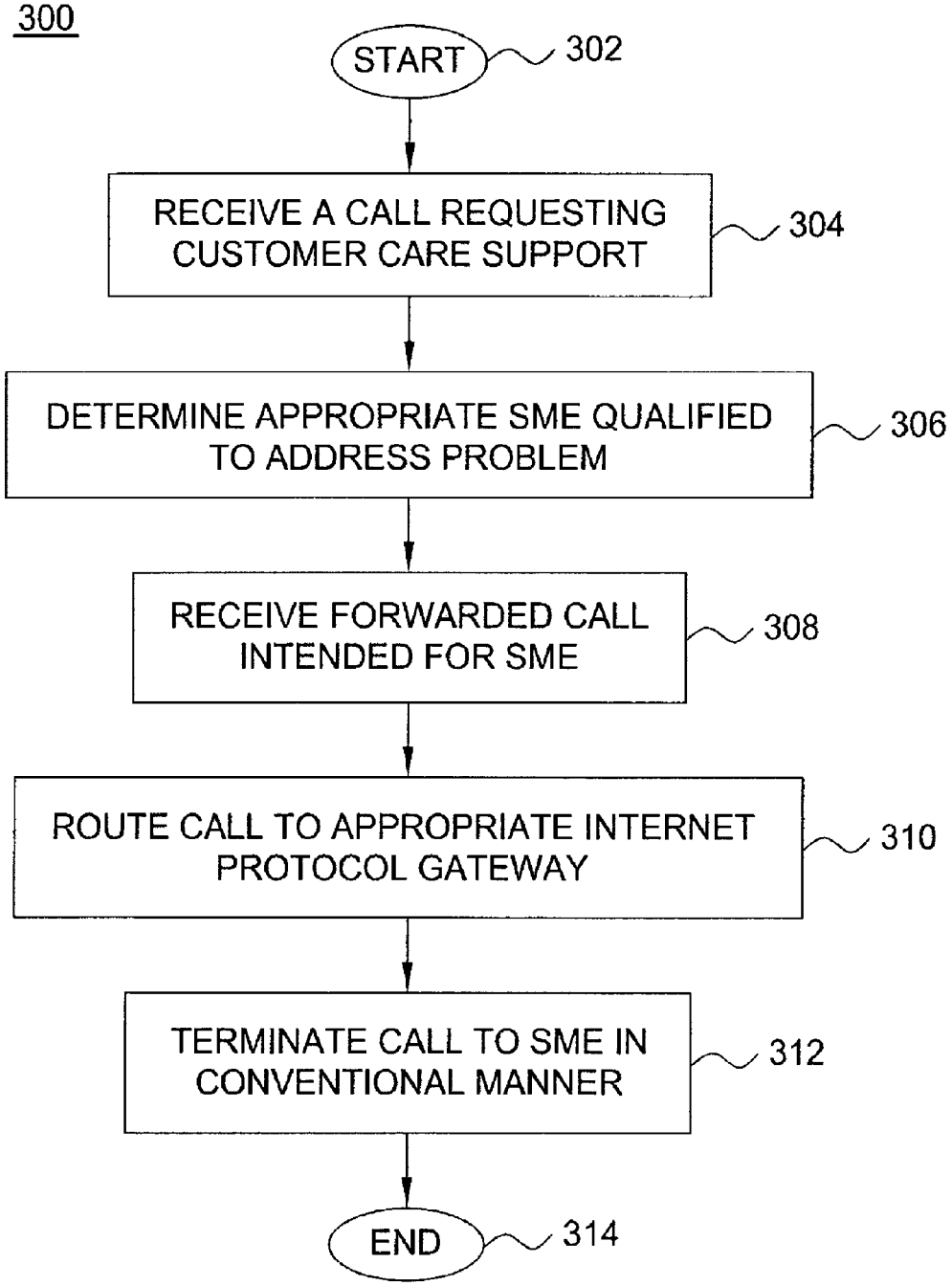
FIG. 3 is a flow diagram depicting an exemplary embodiment of a method for routing a call to a subject matter expert via a packet network in accordance with one or more aspects of the invention.

For example, FIG. 3 is a flow diagram depicting an exemplary embodiment of a method 300 for routing at least one call to a subject matter expert via a packet network, e.g., a VoIP network, as related to one or more aspects of the invention. The method 300 begins at step 302 and proceeds to step 304 where at least one call requesting customer care support is received. In one embodiment, a customer care agent at a customer care center 218 receives a call from a customer using endpoint device 202. Specifically, the customer may place a TDM based call to a 1-800 telephone number that corresponds to the particular customer care center 218.

At step 306, an appropriate subject matter expert (SME) that is qualified to address the customer's problem is determined. In one embodiment, a customer care agent answers the customer call at the customer care center 218 and records the specific problem encountered by the caller. The care agent then determines the appropriate SME who is qualified to address the customer's problem by utilizing the database 216. The SME, who is typically affiliated with the service provider, may be located in a region or area that is considerably far-removed from the customer care center 218 (e.g., in another country). In an effort to reduce telecommunications costs, the customer care center 218 may forward the call to the SME over an Internet Protocol (IP) network 222 via an IP gateway (e.g., BE 208).

At step 308, a forwarded call intended for an SME is received. In one embodiment, an IP gateway 208 receives the call forwarded from the customer care center 218. The IP gateway 208 may comprise a dedicated application server or some other network component equipped to perform routing tasks. In one embodiment, the IP gateway 208 also receives the location information (e.g., the location/address of a foreign IP gateway servicing the SME's location).

At step 310, the call is routed to an appropriate foreign IP gateway. In one embodiment, the original IP gateway 208 (after being provided the location of the SME) routes the call to the appropriate foreign IP gateway 220 that services the area (e.g., country, county, region, etc.) the SME is located in. More specifically, the IP gateway 208 forwards the call to a foreign phone number associated with the foreign IP gateway.

At step 312, the call to the SME is established in a conventional manner. In one embodiment, the foreign IP gateway 220 processes and routes the call to a local access network 210 that provides phone service to the desired SME. For example, the call may be forwarded to a local PSTN in a foreign country. The PSTN then terminates the call by completing the connection between the endpoint device 202 and endpoint device 212. Once the connection is established, the SME, the original calling customer, and/or the customer care center representative may communicate and address the customer's problem. The method 300 then proceeds to step 314 and ends.

Figure 4:
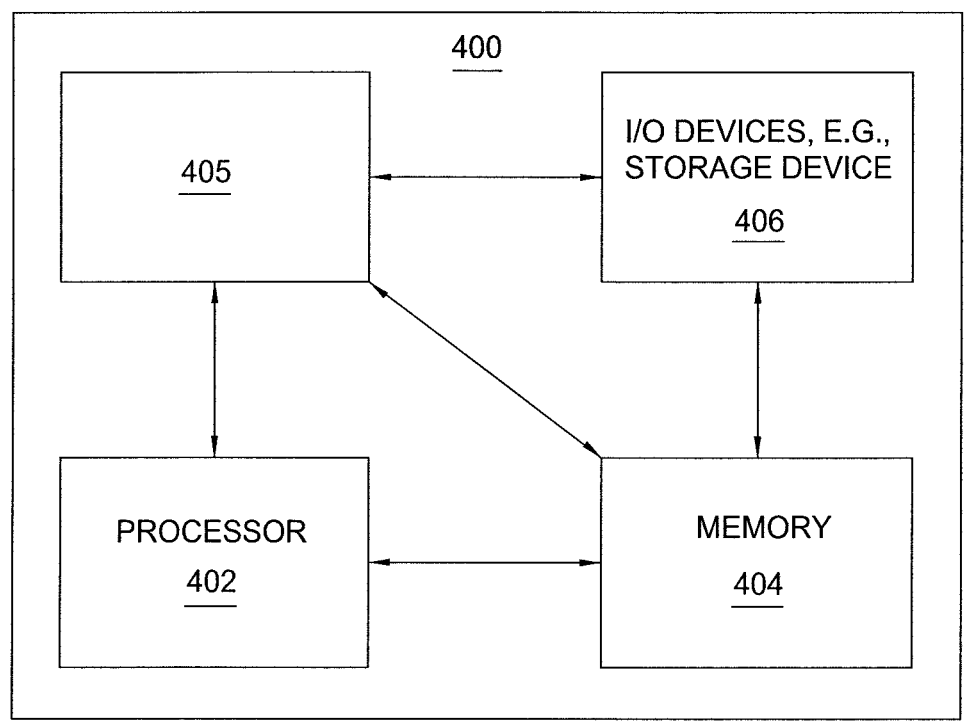
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for routing a call to an SME, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for routing a call to an SME can be loaded into memory 404 and executed by processor 402 to implement the functions as discussed above. As such, the present process 405 routing a call to an SME (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for routing a call to a subject matter expert via a packet network, comprising:
   receiving, by a processor of at a customer care center, a request to route the call to the subject matter expert determined to be qualified in an area of expertise to address a specific problem of a calling customer, wherein the call comprises a toll free call;
   obtaining, by the processor, a predefined foreign location associated with the subject matter expert, wherein the foreign location comprises a location in a foreign country relative to the customer care center; and
   routing, by the processor, the call to a foreign internet protocol gateway of the packet network associated with the predefined foreign location to communicate with the subject matter expert based upon qualifications of the subject matter expert to address the specific problem of the calling customer, wherein the subject matter expert is serviced by an in country partner service provider, wherein the packet network comprises an internet protocol network.

2. The method of claim 1, wherein the predefined location is obtained from a database.

3. The method of claim 1, wherein the routing comprises:
   routing the call to the foreign internet protocol gateway that forwards the call to an access network that terminates the call to the subject matter expert.

4. The method of claim 1, wherein the internet protocol network comprises a service over internet protocol network.

5. An apparatus for routing a call to a subject matter expert via a packet network, comprising:
   a processor of a customer care center; and
   a computer readable medium storing a plurality of instructions which, when executed by the processor, cause the processor to perform operations, the operations comprising:
   receiving a request to route the call to the subject matter expert determined to be qualified in an area of expertise to address a specific problem of a calling customer, wherein the call comprises a toll free call;
   obtaining a predefined foreign location associated with the subject matter expert, wherein the foreign location comprises a location in a foreign country relative to the customer care center; and
   routing-the call to a foreign internet protocol gateway of the packet network associated with the predefined foreign location to communicate with the subject matter expert based upon qualifications of the subject matter expert to address the specific problem of the calling customer, wherein the subject matter expert is serviced by an in country partner service provider, wherein the packet network comprises an internet protocol network.

6. The apparatus of claim 5, wherein the predefined location is obtained from a database.

7. The apparatus of claim 5, wherein the routing comprises:
routing the call to the foreign internet protocol gateway that forwards the call to an access network that terminates the call to the subject matter expert.

8. The apparatus of claim 5, wherein the internet protocol network comprises a service over internet protocol network.

9. A non-transitory computer readable medium storing a plurality of instructions which, when executed by a processor of a customer care center, cause the processor to perform operations for routing a call to a subject matter expert via a packet network, the operations comprising:
receiving-a request to route the call to the subject matter expert determined to be qualified in an area of expertise to address a specific problem of a calling customer, wherein the call comprises a toll free call;
obtaining a predefined foreign location associated with the subject matter expert, wherein the foreign location comprises a location in a foreign country relative to the customer care center; and
routing-the call to a foreign internet protocol gateway of the packet network associated with the predefined foreign location to communicate with the subject matter expert based upon qualifications of the subject matter expert to address the specific problem of the calling customer, wherein the subject matter expert is serviced by an in country partner service provider, wherein the packet network comprises an internet protocol network.

10. The non-transitory computer readable medium of claim 9, wherein the predefined location is obtained from a database.

11. The non-transitory computer readable medium of claim 9, wherein the routing comprises:
routing the call to the foreign Internet protocol gateway that forwards the call to an access network that terminates the call to the subject matter expert.

12. The non-transitory computer readable medium of claim 9, wherein the Internet protocol network comprises a service over Internet protocol network.

* * * * *